United States Patent Office 3,371,054
Patented Feb. 27, 1968

3,371,054
FORMALDEHYDE-REACTIVE ACID BARK AND BARK RESINS AND METHOD OF FORMING SAME
Philip S. Blickensderfer, Hamilton, Ohio, Alan E. Weinberg, Verona, N.J., and William F. Oliver, New Cassel, and Rafael J. Perez, Flushing, N.Y., assignors to Champion Papers Inc., Hamilton, Ohio, a corporation of Ohio
No Drawing. Filed Apr. 26, 1965, Ser. No. 451,019
32 Claims. (Cl. 260—17.2)

This invention relates to the use of tree bark and the like. More particularly, this invention relates to a method of forming resinous condensation products and the like from tree bark and to the resinous products formed thereby.

It has been known that tree bark whether of soft wood, i.e. conifer origin, or of hardwood, i.e. deciduous origin, contains phenolic materials, but past efforts to utilize such phenolic materials in bark have met with indifferent success. An object of this invention is to provide an improved resinous material using bark as a major constituent thereof and to provide a method of forming resinous materials using bark phenolic materials.

A further object of this invention is to provide a bark derivative having enhanced phenolic reactivity and to a method of forming such a bark derivative.

A further object of this invention is to provide means for recovering phenolic values from non-fibrous fractions of bark of coniferous origin.

Briefly, in accordance with this invention, bark or a bark fraction is treated with an alkali metal hydroxide, such as a strong aqueous solution, which is heated, preferably for a sufficient time and to a sufficient temperature, to drive off water and to carry the batch to a substantially dry state, to form an "alkali bark." This heating or "fusion" is preferably carried on in a non-oxidizing or substantially oxygen-free atmosphere to prevent or minimize oxidation. The oxygen-free atmosphere can be nitrogen or carbon dioxide. The alkali bark is acidified to form an "acid bark." Preferably the acidifying is done in an aqueous slurry or solution which can be acidified to a pH of from 2 to 7 and preferably 2 to 4 and more preferably to about 3 to insure that the bark is acidified. The acid bark when rendered alkaline again has a high reactivity with formaldehyde and will form therewith a formaldehyde-acid bark reaction product which can react with additional phenol and formaldehyde either to form a "novolak" type resin or to form a "resole" type resin. Acid bark and a phenol can likewise be reacted with formaldehyde to form heat curing resinous materials. A substantial portion of either type of resin is thus derived from the bark. Such resinous materials can be used for various purposes for which phenol-formaldehyde type resins are used, such as molding materials, laminating resins and plywood adhesives and the like. The conversion of the resins to molding compounds and adhesives and the like can be done by usual methods. With the resins, molding materials can be formed and molded products can be made having high flexural strength and water-resistance and other properties suitable for commercial applications. Preferably, the bark used in forming the resins is mechanically fractionated to remove a major fraction of fibrous materials. The bark is reduced to small particle size and screened or otherwise separated or classified to remove fibrous materials, while the non-fibrous or fine particles which can pass through the screen are used in the formation of acid-bark fines by the method outlined above.

Preferably, the alkali used in the heating or fusion step is sodium hydroxide and the acid used is sulfuric acid so that the by-product of the process is sodium sulfate. The process can be carried out adjacent a paper mill or the like where large amounts of bark are available and where there is a substantial use for the sodium sulfate.

Other mineral acids can be used such as hydrochloric acid, nitric acid, and phosphoric acid but are more costly and do not produce the useful by-product of sodium sulfate. The preferred alkali for the fusion step is sodium hydroxide but other alkali metal hydroxides such as potassium hydroxide can also be used in the fusion step. The fusion step can be carried on until the batch is dry. During the fusion step, the batch is preferably heated to a temperature of 200 to 260° C. and held at such temperature for a time sufficient for the batch to dry. Alkali barks formed by a heating to this temperature can be converted into useful acid barks. Good results are obtained when the batch is heated to a temperature of 220° C. to 240° C. Lower temperatures of 180° and upwards can be used but require a more protracted time of heating. Higher temperatures can be used but the temperature is preferably kept below that at which there is substantial breakdown, cracking, or pyrolysis of the organic materials in the bark. The fusion step can be carried on until most or substantially all of the charge is made water-soluble. When about 90 percent of a test sample of the charge is soluble in a two percent slurry of alkali bark in water, the reaction can be considered to have progressed to form a satisfactory alkali bark.

For the fusion step, preferably as strong an aqueous solution of alkali is used as can conveniently wet all the bark. In a laboratory 38 weight percent aqueous solution of sodium hydroxide is convenient for use but stronger or weaker solutions can be used. However, substantially weaker solutions are not preferred because of the necessity of removing excess water in order to reach the temperatures required.

Preferably about one part by weight of sodium hydroxide on a dry basis is used for each three parts of dry pine bark to give an alkali bark which is almost completely water soluble as determined according to the 90 percent test set forth above. Lower ratios of sodium hydroxide to pinebark give alkali barks of less complete water solubility. Greater ratios of sodium hydroxide can be used, but too much sodium hydroxide is avoided because of the necessity for greater amounts of acid to neutralize excess sodium hydroxide. For other barks the ratio of alkali to bark can be approximately the same as with pine bark but can vary with the composition of the bark.

In particular the acid treatment of alkali bark produces a material which is highly reactive with formaldehyde and with phenol formaldehyde condensates. When the acid bark is returned to an alkaline condition or re-alkified, a substantially greater proportion of formaldehyde can react with the bark than with an unacidified alkali bark.

The following examples are given to illustrate the invention in greater detail, but it is to be understood that the examples are given primarily by way of example, rather than by way of limitation, except as set forth in the claims. In the following examples and in the remainder hereof, all parts and percentages are taken by weight.

Example I

A thousand parts of mill run southern yellow pine bark, consisting chiefly of bark of loblolly pine (*Pinus taeda*) and shortleaf pine (*Pinus echinata*) bark, were reduced in a hammer mill to a size which could be fed to a commercially available disc refiner or attrition mill and then fed to the attrition mill. The attrition mill product was separated using a metal deck screen having $3/64$ inch diameter openings, and the material held by the screen was passed through a second attrition mill. The second attrition mill product was separated using a metal deck screen having 1/16 inch diameter openings. The fine material passing the screens was collected to form 550 parts of dry pine bark fines.

450 parts of the dry pine bark fines were mixed with 394 parts of a 38% aqueous solution of sodium hydroxide. The mixture was allowed to stand overnight. The mixture was then heated under a nitrogen blanket with stirring using an external heater and until the batch was dry and until the temperature at the interior of the charge was approximately 230° centigrade to form 394 parts of alkali bark fines. The heating required six and one-half hours. The alkali bark fines were reduced to a powder. A one part sample of the alkali bark fines was removed and slurried with 50 parts of hot water at approximately 82° C. Over 90 percent of the sample was found to be soluble in the hot water.

393 parts of alkali bark fines were added to 393 parts of water in a kettle with agitation to form a smooth slurry or dispersion, constituents of which were the soluble values in solution and the dispersed insoluble values. Commercial concentrated sulfuric acid (66° Bé.) was added from a dropping funnel with agitation. Water was added as needed to maintain the slurry at a stirrable consistency (i.e. to maintain viscosity) and clean the sides of the kettle. Acid addition was continued until a pH of 3 was obtained. At this point, sufficient water was added to bring the total water to 655 parts. Approximately 121 parts of sulfuric acid were used. The batch was filtered thereby separating the acid bark from the slurry. The filter cake was slurried in 655 parts of fresh water and again filtered to remove sodium sulfate and dried at 71° C. overnight to remove moisture and to produce 342 parts of acid bark fines.

*Example II*

A kettle equipped with a stirrer, thermometer, and reflux condenser was charged with 46.5 parts of commercial 37% formaldehyde, 20 parts of water and 4.5 parts of commercial 97% sodium hydroxide. Heat was applied and 40 parts of the acid bark fines of Example I were charged with agitation. The batch was heated to reflux (90° C.) in approximately 45 minutes. Heat was turned off after 45 minutes at reflux. A free formaldehyde analysis by the standard sulfite method indicated 3.6% remained at the end of the reaction as against an initial 15.5% at the start. Upon drying, there was a yield of 50 parts of acid bark fines-formaldehyde condensation product.

*Example III*

20 parts of the acid bark fines-formaldehyde condensation product of Example II were charged into a kettle with 25.9 parts of 37% formaldehyde solution and 41.8 parts of commercial 90% phenol containing 10% water. The pH was adjusted to 6.0 with sulfuric acid and the reaction was brought to reflux. After 3 hours of reflux, the resin was vacuum concentrated to form 65 parts of a resin suitable for molding in accordance with usual molding practices. Specimens molded with this resin were fully satisfactory as to flexural strength and water absorption for purposes for which these resins can be used.

*Example IV*

20 parts of the acid bark fines-formaldehyde condensation product of Example II were charged into a kettle with 36.5 parts of 37% formaldehyde solution and 31.3 parts of the same commercial 90% phenol used in Example III. The pH was adjusted to 10 with 50% aqueous NaOH solution. The batch was heated to and held in a temperature range of 70–80° C. for 3 hours to form a resole type resin. The resin was concentrated under vacuum to form 56 parts of resin. Molded materials formed from this resole resin were of excellent high flexural strength and low water absorption.

*Example V*

160 parts of the acid bark fines of Example I, 282 parts of the same commercial 90% phenol used in Example III and 472 parts of commercial 37% formaldehyde solution were charged into a kettle. The pH was adjusted to 10.5 with 50% aqueous NaOH solution. The batch was heated and was held in a temperature range of 70° to 80° C. for 3 hours to form a resole type resin. The resin was concentrated under vacuum to form 567 parts of resin. Specimens molded with this resin were fully satisfactory as to flexural strength and water absorption for purposes for which resole type resins can be used.

*Example VI*

550 parts of whole southern yellow pine bark were pulverized to pass a 100 mesh standard screen. 200 parts of commercial 76% sodium hydroxide flakes were dissolved in 350 parts of water to form an alkali solution. The 550 parts of finely divided bark were intimately mixed with the alkali solution to be wet thereby. Then the mixture was loaded in an autoclave, and the autoclave was heated with the contents under a nitrogen blanket with stirring using an external heater for 8 hours and until the interior temperature reached 180° C. to form 559 parts of alkali bark. The alkali bark was reduced to a powder and was added to 559 parts of water in a kettle with agitation to form a smooth slurry. Commercial concentrated sulfuric acid was added from a dropping funnel with agitation. Water was added as needed to maintain viscosity and clean the sides of the kettle. Addition of sulfuric acid was continued until a pH of 3 was observed. At this point, sufficient water was added to bring the total water to 900 parts. The batch was filtered. The filter cake was slurried with 900 parts of water and again filtered and dried at 71° C. overnight to produce 309 parts of acid bark.

*Example VII*

50 parts of the acid bark of Example VI were finely pulverized and were charged into a kettle with 83.5 parts of commercial 90% phenol including 10% water, and 38 parts of 95% paraformaldehyde. The pH of the batch was adjusted to approximately 8.3 with 30% aqueous sodium hydroxide solution. 9 parts of the sodium hydroxide solution were required. The batch was heated and was held at a temperature of approximately 70° C. for one hour and ten minutes to form a resole type resin. The resin was concentrated under vacuum to form 159 parts of resole type resin. Molded materials were formed from this resole resin.

*Example VIII*

935 parts of hardwood tree bark consisting chiefly of bark of cottonwood (*Populus deltoides*), elm (*Ulmus americana*) and sweet gum (*Liquidamber styraciflua* l.) bark were reduced in a hammer mill to a size to be fed to a standard attrition mill and then fed to an attrition mill with plates spaced 0.1 inch. The attrition mill product was separated using a metal deck screen having 3/64 inch diameter openings and the material held by the screen was passed through a second attrition mill with 0.01 inch spacing between plates. The second attrition mill product was separated using a metal deck screen having 1/16 inch diameter openings. The fine material passing through the screens was collected to form 510 parts of dry hardwood bark fines.

*Example IX*

510 parts of the hardwood bark fines, 300 parts of water and 200 parts of commercial 76% sodium hydroxide were charged into a kettle and heated under a nitrogen atmosphere for 12 hours at the end of which time the interior temperature was 280° C. to yield 510 parts of alkali hardwood bark fines. A one part sample of the product was removed and slurried into 50 parts of hot water at approximately 82° C. 87% of the sample was found to be soluble in the hot water.

480 parts of the alkali hardwood bark fines was slurried into 480 parts of water in a kettle and agitated to form a smooth slurry. 130 parts of commercial concentrated sulfuric acid was added from a dropping funnel with agitation. Water was added as needed to maintain viscosity and to clean the sides of the kettle. Sufficient water was added to bring the total water added to 1000 parts. The batch was filtered. The filter cake was slurried with 870 parts of fresh water, filtered, again slurried with 1100 parts of fresh water and again filtered and dried at 71° C. overnight to remove water and produce 221 parts of acid hardwood bark fines which are suitable for use in the same manner as the acid bark fines described in Example I.

*Example X*

A kettle equipped with a stirrer, thermometer and a reflux condenser was charged with 40 parts of water, 6 parts of sodium hydroxide, 78.7 parts of commercial aqueous formaldehyde solution (37% formaldehyde), 44.5 parts of the acid bark fines of Example I, and 41.9 parts of a commercial phenol mixture consisting of 90 percent phenol and 10 percent cresol. The batch was heated to reflux (90° C.) in approximately one hour. Heat was turned off after 45 minutes at reflux to form 204 parts of a viscous smooth syrup resin. A sample of this syrup resin was heated at 79° C. for 75 minutes to remove water and dry the sample. After such heating of the sample, 56.5 percent of the sample remained as essentially dry resin solids.

*Example XI*

88 parts of the syrup resin of Example X were intimately mixed with 50 parts of wood flour and 38 parts of isopropanol. The mixture, after mixing, was dried at 79° C. for 75 minutes to form 110 parts of molding powder. The molding powder was molded at a temperature of 149° C. and a pressure of 4000 pounds per square inch gauge for fifteen minutes. The molded specimen had a flexural strength of 16,495 p.s.i. when tested according to ASTM D-790-63 Procedure A using a molded bar tested parallel to the molding pressure.

*Example XII*

53 parts of the syrup resin of Example X were intimately mixed with 70 parts of wood flour and 38 parts of isopropanol. The mixture, after mixing, was dried at 79° C. for 75 minutes to form 110 parts of molding powder. The molding powder was molded at a temperature of 149° C. and a pressure of 4000 p.s.i.g. for five minutes. The molded specimen had a flexural strength of 15,740 p.s.i. tested according to the same method as that of Example XI.

In the results of Example II, approximately 33 parts of formaldehyde reacted with 100 parts of acid bark fines. With other bark samples, greater or lesser amounts of formaldehyde can react under similar alkaline conditions with 100 parts of acid bark, but regularly, at least 20 parts of formaldehyde or more can react with 100 parts of acid bark fines produced by the methods of this invention, and the acid barks are highly formaldehyde-reactive, i.e., capable of reacting with substantial amounts of formaldehyde.

In the formation of resins with the acid barks of this invention, we prefer to incorporate some phenol in addition to the phenolic materials of the acid barks. The phenol can be the chemical known as phenol or the commercial phenolic material consisting of phenol with up to about 20 percent cresol and other phenols such as the oil soluble substituted or alkylated phenols. In addition other materials of the phenol class such as resorcinol, and cresol can be used instead of or in association with phenol in the preparation of resins. The resins contain more than one mole of combined formaldehyde per mole of phenol or its equivalent and can contain from 1 to about 2.5 moles of combined formaldehyde per mole of phenol or phenol equivalent. Particularly good results are obtained with resins in which there is from 1.4 to 1.6 moles of combined formaldehyde per mole of phenol or its equivalent.

Particularly good resins are obtained when the realkified acid barks are reacted with a phenol and formaldehyde at a pH of approximately 10 to 11 in such a manner that the resin contains up to about 50 percent by weight of bark derivatives. Resins containing 25 to 30 percent by weight of bark derivatives have been found particularly desirable.

Good moldings are obtained when the resin is mixed with usual fillers such as wood flour and when the molding composition is from 20 to 50 percent resin and from 80 to 50 percent wood flour or other filler. Such molding compositions can be converted into thermoset moldings by heating at temperatures of 250° to 375° F. (121° to 190° C.) for 2 to 15 minutes at pressures of 500 to 4000 p.s.i.g.

The examples show conditions suitable for typical tree barks, but optimum conditions can vary with the nature of the tree bark used.

The acid barks can be reacted or condensed with formaldehyde or a formaldehyde donor either to form a resole or a novolak type resin. By a resole type resin, we mean one which results from the reaction of a phenolic type material (such as acid bark) with an excess of formaldehyde wherein the reaction is incomplete and can be completed by heat curing at a suitable temperature. By a novolak type resin we mean one which results from the reaction of a phenolic type material with a deficiency of formaldehyde. With such a novolak type resin, additional formaldehyde or a formaldehyde donor is added before curing.

In the practice of our invention, we prefer to use bark from trees from the woody parts of which papermaking fibres may be recovered. Both soft wood bark (of conifer origin) and hardwood bark (of deciduous origin) can be used.

Other modifications can be made in the method of this invention without departing from the spirit and scope of the appended claims.

What we claim as novel and desire to secure by Letters Patent is:

1. A method of forming a resin which comprises reducing tree bark to fine particle size, separating fibrous particles of the bark from non-fibrous particles, mixing the non-fibrous particles with an aqueous alkali metal hydroxide solution to form a mixture, heating the mixture in a substantially oxygen-free atmosphere to drive off water and until the temperature thereof reaches approximately 200° C. to 260° C. to form a substantially dry alkali bark, forming a slurry of the alkali bark in water, acidifying the slurry to form an acid bark therein, and condensing the acid bark with formaldehyde.

2. A method of forming formaldehyde-reactive material from tree bark which comprises reducing tree bark to fine particle size, separating fibrous particles from non-fibrous particles, mixing the non-fibrous particles with an aqueous alkali metal hydroxide solution to form a mixture, heating the mixture in a substantially oxygen-free atmosphere to drive off water and until the temperature thereof reaches approximately 200° to 260° C. to form a substantially dry alkali bark, forming a slurry of the alkali bark, and acidifying the slurry to form a formaldehyde-reactive acid bark.

3. A method of forming a resin which comprises reducing tree bark to fine particle size, separating fibrous particles of the bark from non-fibrous particles, mixing the non-fibrous particles with an aqueous alkali metal hydroxide solution to form a mixture, heating said mixture in a substantially oxygen-free atmosphere to a temperature in the range from about 220° to 240° C. and holding the mixture at such temperature to drive off water to form a substantially dry alkali bark, forming a slurry of the alkali bark in water, acidifying the slurry to form an acid bark therein, separating the acid bark from the solution and condensing the acid bark with formaldehyde and phenol to form a resin.

4. A method of forming formaldehyde-reactive material from tree bark which comprises heating in a substantially oxygen-free atmosphere a mixture of the bark with an alkali metal hydroxide until the temperature reaches approximately 200° to 260° C. and holding the mixture within such temperature range for a time sufficient for the mixture to dry to form an alkali bark and acidifying the alkali bark to form a formaldehyde-reactive acid bark.

5. A method of forming a resin which comprises heating a mixture of tree bark and an aqueous alkali metal hydroxide solution in a substantially oxygen-free atmosphere to drive off water and until the temperature reaches approximately 200° to 260° C. to form a substantially dry alkali bark, forming a slurry of the alkali bark in water, acidifying the slurry to form an acid bark therein, and condensing the acid bark with formaldehyde and phenol to form a resin.

6. A method of forming formaldehyde-reactive material from tree bark which comprises reducing tree bark to fine particle size, separating fibrous particles from non-fibrous particles, mixing the non-fibrous particles with an aqueous solution of an alkali metal hydroxide, heating the mixture thus formed in a substantially oxygen-free atmosphere until the temperature of the mixture reaches approximately 200° to 260° C. to drive off water and until dry to form an alkali bark, forming a slurry of the alkali bark and acidifying the slurry to form a formaldehyde-reactive acid bark.

7. A method of forming formaldehyde-reactive material from tree bark which comprises heating in a substantially oxygen-free atmosphere a mixture of the bark with an alkali metal hydroxide until the temperature thereof is in the range between 180° C. and the temperature at which there is substantial chemical cracking of the material of the bark and held within such temperature range for a sufficient time for the mixture to dry to form an alkali bark, forming a slurry of the alkali bark and acidifying the slurry to form a formaldehyde-reactive acid bark.

8. A method of forming a formaldehyde-reactive material from tree bark which comprises reducing tree bark to fine particle size, separating fibrous particles from non-fibrous particles, mixing the non-fibrous particles with an aqueous solution of an alkali metal hydroxide, heating the mixture thus formed in a substantially oxygen-free atmosphere to drive off water and until the temperature thereof is in the range between approximately 200° to 260° C. to form a substantially dry alkali bark, forming a slurry of the alkali bark, acidifying the slurry with sufficient acid to lower the pH to approximately 3 to form a formaldehyde-reactive acid bark, and separating the acid bark from the slurry.

9. A method of forming a formaldehyde-reactive material from tree bark which comprises reducing tree bark to fine particle size, separating fibrous particles from non-fibrous particles, mixing the non-fibrous particles with aqueous sodium hydroxide solution, heating the mixture thus formed in a substantially oxygen-free atmosphere to drive off water and until the temperature reaches approximately 200° to 260° C. to form a substantially dry alkali bark, forming a slurry of the alkali bark, acidifying the slurry to form a formaldehyde-reactive acid bark, and separating the acid bark from the slurry.

10. A method of forming a heat curing resin which comprises reducing tree bark to fine particle size, separating fibrous from non-fibrous particles, mixing the non-fibrous particles with an aqueous alkali metal hydroxide solution to form a mixture, heating said mixture in a substantially oxygen-free atmosphere to drive off water at a temperature of 180° to 260° C. and until a substantially dry alkali bark is formed having substantially 90% water solubility, forming a dispersion of said alkali bark in water, acidifying the dispersion to form an acid bark therefrom wherein 100 parts by weight of said acid bark are reactable with at least 20 parts of formaldehyde under alkaline conditions, and reacting said acid bark with formaldehyde and a phenol to form a heat curing resin.

11. A method in accordance with claim 10 in which the alkali metal hydroxide is sodium hydroxide.

12. A method in accordance with claim 11 in which said mixture is approximately one part by weight of sodium hydroxide with three parts by weight of substantially dry non-fibrous particles.

13. A method in accordance with claim 10 in which the oxygen-free atmosphere is nitrogen.

14. A method in accordance with claim 10 in which the oxygen-free atmosphere is carbon dioxide.

15. A method in accordance with claim 10 in which the dispersion of alkali bark in water is acidified to a pH of from 2 to 7 to form acid bark.

16. A method in accordance with claim 10 in which the resin contains 1 to 2.5 moles of combined formaldehyde per mole of phenol.

17. A method in accordance with claim 10 in which the resin contains 1.4 to 1.6 moles of combined formaldehyde per mole of phenol.

18. A method of forming an acid bark for use in forming a heat curing resin which comprises reducing tree bark to fine particle size, separating fibrous from non-fibrous particles, mixing the non-fibrous particles with an aqueous alkali metal hydroxide solution to form a mixture, heating said mixture in a substantially oxygen-free atmosphere for a time sufficient to drive off water at a temperature of 180° to 260° C. and until a substantially dry alkali bark is formed having substantially 90% water solubility, forming a dispersion of said alkali bark in water, and acidifying the dispersion to form an acid bark therefrom wherein 100 parts by weight of said acid bark are reactable with at least 20 parts of formaldehyde under alkaline conditions.

19. A method of forming a heat curing resin which comprises reducing tree bark to fine particle size, mixing the particles with an aqueous alkali metal hydroxide solution, heating the mixture thus formed in a substantially oxygen-free atmosphere to drive off water at a temperature of 180° to 260° C. and until a substantially dry alkali bark is formed having substantially 90% water solubility, forming a dispersion of said alkali bark in water, acidifying the dispersion to form an acid bark therefrom, and reacting said acid bark with formaldehyde and a phenol to form a heat curing resin.

20. A formaldehyde-reactive bark derivative prepared by reducing tree bark to fine particle size, mixing the particles with an aqueous alkali metal hydroxide solution to form a mixture, heating the mixture in a substantially oxygen-free atmosphere to drive off water and until the temperature thereof reaches the range of 180° C. to the temperature at which there is substantial chemical cracking of the material of the bark to form an alkali bark, forming a slurry of the alkali bark in water, and acidifying the slurry to form an acid bark therein to form a formaldehyde reactive bark derivative wherein 100 parts by weight of said bark derivative are reactable with at least 20 parts of formaldehyde under alkaline conditions.

21. A formaldehyde-reactive bark derivative made by the process of claim 4.

22. A formaldehyde-reactive bark derivative prepared by reducing tree bark to fine particle size, separating fibrous particles of the bark from non-fibrous bark fines, heating bark fines mixed with aqueous alkali metal hydroxide in a substantially oxygen-free atmosphere to a temperature of 200° to 260° C. for a sufficient time for the mixture to dry and until substantially 90 percent water soluble followed by acidification thereof, 100 parts by weight of said bark derivative being reactable with at least 20 parts of formaldehyde under alkaline conditions.

23. A method of forming a heat curing resin which comprises reducing coniferous tree bark to fine particle size, separating fibrous from non-fibrous particles, mixing the non-fibrous particles with an aqueous alkali metal hydroxide solution, heating the mixture thus formed in a substantially oxygen-free atmosphere to drive off water at a temperature of 180° to 260° C. and until a substantially dry alkali bark is formed having substantially 90% water solubility, forming a dispersion of said alkali bark in water, acidifying the dispersion to form an acid bark therefrom wherein 100 parts by weight of said alkali bark are reactable with at least 20 parts of formaldehyde under alkaline conditions, and reacting said acid bark with formaldehyde and a phenol to form a heat curing resin.

24. A method of forming a heat curing resin which comprises reducing southern yellow pine bark to fine particle size, separating fibrous from non-fibrous particles, mixing the non-fibrous particles with an aqueous alkali metal hydroxide solution, heating the mixture thus formed in a substantially oxygen-free atmosphere to drive off water at a temperature of 180° to 260° C. and until a substantially dry alkali bark is formed having substantially 90% water solubility, forming a dispersion of said alkali bark in water, acidifying the dispersion to form an acid bark therefrom wherein 100 parts by weight of said alkali bark are reactable with at least 20 parts of formaldehyde under alkaline conditions, and reacting said acid bark with formaldehyde and a phenol to form a heat curing resin.

25. A formaldehyde-reactive bark derivative prepared by heating in a substantially oxygen-free atmosphere coniferous tree bark fines mixed with aqueous alkali metal hydroxide to a temperature of 200° to 260° C. for a sufficient time to dry followed by acidification thereof, 100 parts by weight of said bark derivative being reactable with at least 20 parts of formaldehyde under alkaline conditions.

26. A formaldehyde-reactive bark derivative prepared by heating in a substantially oxygen-free atmosphere southern yellow pine bark fines mixed with aqueous alkali metal hydroxide to a temperature of 200° to 260° C. for a sufficient time to dry followed by acidification thereof, 100 parts by weight of said bark derivative being reactable with at least 20 parts of formaldehyde under alkaline conditions.

27. A method of forming a formaldehyde-reactive material which comprises reducing tree bark to fine particle size, mixing the tree bark particles with an alkali metal hydroxide to form a mixture, heating the mixture in a substantially oxygen-free atmosphere until the temperature thereof is in the range between 180° C. and the temperature at which there is substantial chemical cracking of the material of the bark for a sufficient time to dry to form an alkali bark, and contacting the alkali bark with an acid to form an acid bark.

28. A method in accordance with claim 27 in which the mixture is heated to a temperature in the range between 200° C. and 260° C.

29. A method of forming a resin which comprises reducing tree bark to fine particle size, mixing the tree bark particles with an alkali metal hydroxide to form a mixture, heating the mixture in a substantially oxygen-free atmosphere until the temperature thereof is in the range between 180° C. and the temperature at which there is substantial chemical cracking of the material of the bark for a sufficient time to dry to form an alkali bark, contacting the alkali bark with an acid to form an acid bark, and condensing the acid bark with formaldehyde in an alkaline medium.

30. A method of forming a resin which comprises reducing tree bark to fine particle size, separating fibrous particles of the bark from the non-fibrous particles, mixing the non-fibrous particles with an alkali metal hydroxide to form a mixture, heating the mixture in a substantially oxygen-free atmosphere until the temperature thereof is in the range between 180° C. and the temperature at which there is substantial chemical cracking of the material of the bark for a sufficient time to dry to form an alkali bark, contacting the alkali bark with an acid to form an acid bark, and condensing the acid bark with formaldehyde in an alkaline medium.

31. A method of forming an acid bark for use in forming a resin which comprises reducing southern pine tree bark to fine particle size, separating the bark into a fraction that comprises substantially the fibrous particles of the bark and into another fraction comprising substantially the non-fibrous particles, mixing the non-fibrous particle fraction with an alkali metal hydroxide to form a mixture, heating the mixture in a substantially oxygen-free atmosphere until the temperature thereof is in the range between about 200° C. and 260° C. and for a time sufficient to form a dry product comprising an alkali bark, and contacting the alkali bark with an acid to form an acid bark.

32. A method of forming formaldehyde-reactive material from tree bark which comprises heating in a substantially oxygen-free atmosphere a mixture of tree bark with an alkali metal hydroxide until the temperature thereof is in the range between 180° C. and the temperature at which there is substantial chemical cracking of the tree bark, holding the mixture within such temperature range for a sufficient time for the mixture to dry to form an alkali bark, forming a slurry of the alkali bark, and acidifying the slurry to form a formaldehyde-reactive acid bark.

References Cited
UNITED STATES PATENTS 2,574,785  11/1951  Heritage _____ 260—17.2
3,025,250   3/1962  Herrick et al. _____ 260—17.2

WILLIAM H. SHORT, *Primary Examiner.*

E. M. WOODBERRY, *Assistant Examiner.*